April 24, 1934. A. H. WARTH 1,956,481
SPOT CROWN AND LINER MATERIAL THEREFOR
Filed June 16, 1933
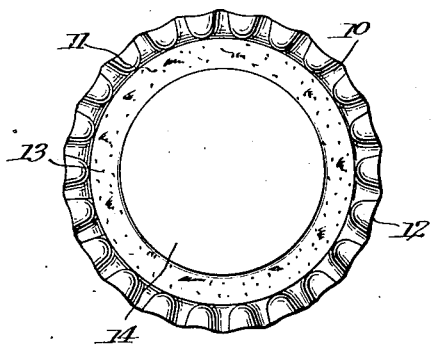
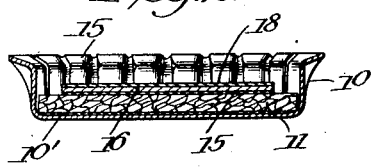
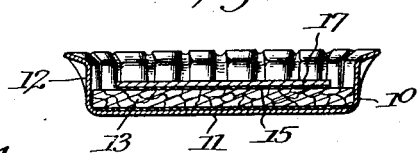
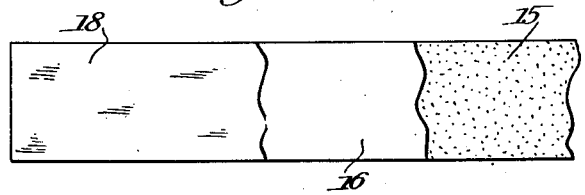
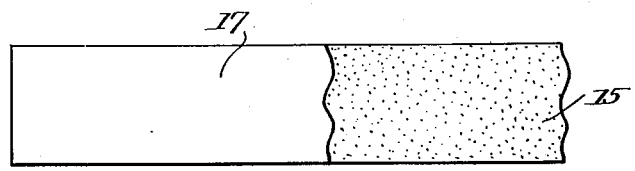
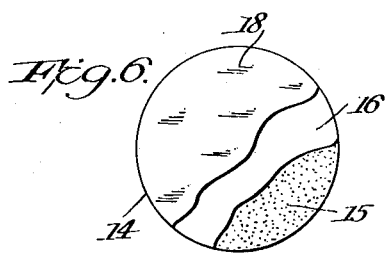
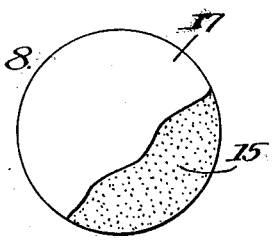
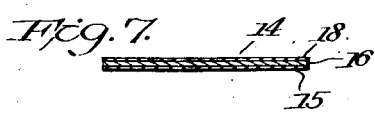
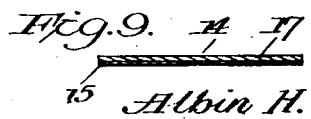
Inventor
Albin H. Warth
By Cushman, Darby & Cushman
Attorneys Patented Apr. 24, 1934

1,956,481

UNITED STATES PATENT OFFICE 1,956,481

SPOT CROWN AND LINER MATERIAL THEREFOR

Albin H. Warth, Baltimore, Md., assignor to Crown Cork & Seal Company, Inc., Baltimore, Md., a corporation of New York Application June 16, 1933, Serial No. 676,190

16 Claims. (Cl. 215—39)

The present invention relates to container closures and particularly to caps of the crown type which include a shell, a cushion liner affixed thereto, and a center spot facing of resistant material such as paper or metal foil bonded to the liner, by a stratum of liquid-resistant and thermo-plastic or heat-fusible adhesive. A closure of this type is described for example in my Patent 1,899,783 granted February 28, 1933. With such a cap the spot is centered with respect to the liner disc and in use, the spot is interposed between the sealing lip of a container and the cushion liner, whereby the seal is enhanced and the contents are kept out of contact with the cushion material of the liner.

It is important (1) that the spot be maintained in this centered relationship and that the adhesive afford a secure and permanent bond to assure optimum sealing, and (2) that the adhesive stratum which is liquid-resistant be maintained continuous and as a completely and impervious covering to cooperate with the spot facing and afford an additional barrier means to prevent contact of the contents with the material of the cushion liner. It is also desirable that the adhesive be heat-fusible or thermoplastic, whereby the facing may be adhered to the cushion liner by the application of heat and pressure; for example, in accordance with the method described in my Patent No. 1,788,260, granted January 6, 1931.

Thus, the liner material usually of cork or composition cork, i. e., granulated cork and a binder, and occasionally rubber, rubber composition, cardboard or paper materials, has a tendency to shrink or contract, and may in some cases expand, while the cap is being aged in storage and during incidental handling prior to application to a container. This is particularly true with certain types of caps, for example, those containing composition cork, i. e. granulated cork and a binder, where it is desirable that the caps be stored for a period of four to six months before being shipped to the consumer, and during this curing period there occurs a partial shrinkage of the composition cork disc.

Therefore, if the adhesive employed has a tendency to contract or stiffen or dry out, i. e. lose its life or granulate, the continuous adhesive stratum is cracked and physical changes, such as shrinkage in the liner will cause the bond to fracture with consequent further disruption of the adhesive stratum. If the fracture is partial, the facing is loosened and shifted out of center. In many cases, the fracture is so complete that the facing actually falls off or completely separates. Where observable such defective caps are rejected and this is not only expensive from the material standpoint, but usually the entire lot must be again inspected with consequent loss of time.

If the adhesive bond has assumed a brittle state or become weakened and fragile, and the cap is applied to the container, the compression of the cork liner incident to the capping operation which causes it to bulge downwardly in the center, fractures the adhesive and allows the facing spot to shift substantially, and separate from the liner. Hence, the seal is imperfect and the contents are afforded opportunity to contact with the liner disc. Moreover, since the adhesive layer is liquid-resistant as described in my aforesaid patent, this slippage and partial or complete separation of the facing and liner and breaking down of the adhesive stratum, destroys the waterproof barrier between the contents and the liner formed by such layer bonding material. That is to say, the stratum of adhesive coextensive with the facing affords an additional means to prevent the contact of the contents with the material of the liner disc. Since not infrequently, the liquid contents permeate the paper or foil if the facing is defective, any shifting or separation of the facing and disruption of the continuous bonding stratum therefore renders this interposed protecting layer ineffective, in that exposed unprotected areas of the cushion material are presented to the contents.

This same objection arises where the bond or adhesive of the cap loses its life and becomes brittle or contracts and granulates in use upon the container. Mineral waters for example, and other liquids are often bottled under high gaseous pressures of 4½ to 6 volumes of carbon dioxide and stored for a year or more. Should the protective adhesive layer tend to brittleness and contract or granulate or the internal pressure fractures the bond to loosen the spot, exposed portions of the area of the liner will be wetted by the contents, particularly where the same have permeated the material of the facing spot.

Hence, resultant wetting of the liner disc will occur due to displacement of the spot facing and contraction and fracture of the adhesive and waterproof barrier. This wetting or saturation of the liner will cause the same to warp or expand, and as the bulge increases, the break becomes intensified and finally the spot completely separates from the liner. With the breaking down of the adhesive protecting layer, the seal is destroyed and contact of the contents with the liner which is generally to be avoided ensues. This produces off-flavors and discoloration, reducing the value of the sealed product.

The above objections and disadvantages are those encountered with caps wherein the facing is united to the cushion liner by conventional adhesives. Such adhesives as gutta percha composition or tissue, referred to in my above mentioned patent, are satisfactory, but do not entirely solve the several problems recited. Among the difficulties which have arisen in connection with the use of caps employing a gutta percha adhesive to unite the center spot to the cushion liner are the following:

(1) Gutta percha in the presence of moisture or high heat, to which the caps are subjected in pasteurization and sterilization processes, tends to swell and to separate the facing from the cushion liner. This is particularly noticeable upon the removal of crown caps from beer and other beverages after the caps have been applied for an extended period of time, such as several months.

(2) Gutta percha has a comparatively greater adhesive affinity for cork (composition or natural) than for metal foil. This is particularly evident upon the removal of caps from bottles after they have been applied for an extended period. It is observed that the center spot facing either falls off or may be readily removed from the cork disc, leaving a distinct layer of gutta percha. Very little, if any, of the gutta percha adheres to the facing. This is so objectionable that bottlers of many products, including "White Rock" water, will not use center spot caps in which the foil is adhesively united to the cork liner with gutta percha.

(3) After application to a bottle for an extended period gutta percha tends to oxidize and lose its plasticity. Consequently, variation of the shape of the cushion liner, such as occurs under temperature and moisture changes during storage of the caps, tends to cause the facing to separate or fall from the cushion liner, due to the lack of plasticity in the gutta percha stratum. Crown caps are frequently stored in the manufacturing plant for months and are stored by the purchaser for an equal period before use. Hence, the desirability of an adhesive which is permanently plastic, or substantially so.

(4) In order to obtain a highly effective adhesion of gutta percha to metal foil, particularly in the warm weather, it is necessary to size the surface of the metal foil before applying the gutta percha. This involves a manufacturing step which it would be preferable to eliminate. The necessity for this pre-sizing becomes evident after the material has been in the cap for a considerable period.

It is an object of the present invention to provide an improved cap including a facing adherently united thereto by an adhesive having substantially all of the advantages of gutta percha as described in my aforesaid patent and which overcomes the foregoing and other objections to a cap containing gutta percha as a uniting medium for the center spot.

I have discovered that in order to meet the severe conditions mentioned above, the cap must include a facing secured to the cushion liner by a layer of thermo-plastic or heat-fusible adhesive which is (1) permanently plastic; (2) non-oxidizable and non-drying and (3) firm at normal or room temperatures. I have further discovered that these characteristics are obtainable by the use of an adhesive containing, as a base, a cellulose derivative adhesive, such as nitro-cellulose. Cellulose acetate may also be used. I have found it highly desirable to enhance the adhesive properties of the nitro-cellulose by the use of a modifying agent, and for this purpose I prefer a resin, and particularly a synthetic resin, as hereinafter set forth in detail. A suitable solvent and also a plasticizing medium may be used.

By permanently plastic, I mean that the adhesive has a longer life than conventional adhesives and is free from any tendency to dry out or granulate or assume a brittle state. That is, in a cap of the present invention, the adhesive exhibits an ability to remain plastic, as well as flexible, resilient and firm, for long periods of time under the various conditions surrounding its manufacture and use upon a container.

By non-oxidizable, I mean that the adhesive stratum is not effected by exposure to air or oxygen and oxygen compounds such as may be produced in a sealed container. This freedom from oxidization is directly traceable to the absence of any substantial amounts of oxygen reacting substances in the composition or drying oils such as tung oil or soya bean oil which tend to oxidize and thus contract or granulate to render the stratum brittle and fragile. While the absence of oils which have an extreme oxidizing tendency with a resultant brittling effect is emphasized, I do not mean to exclude the use of oils which do no have this effect. Oils may be divided into three classes, namely (a) oxidizing or drying oils, e. g. tung or linseed (raw Chinawood or raw linseed oil); (b) semi-oxidizing oils, e. g. processed rape seed oil, and (c) non-oxidizing oils, e. g. such as castor oil and fish oil. The use of the non-oxidizing oils and of small amounts combined therewith of semi-oxidizing oils with the amount being insufficient to have a marked brittling effect is not excluded.

By non-drying, I mean that the adhesive is free of substances which dry out themselves or accelerate drying and cause contraction and brittleness. Thus the absence of oxidizable and non-drying constituents favors the preservation of permanent plasticity for considerably longer periods than can be obtained with conventional bonding agents.

By firm, I mean that the adhesive, at normal room temperatures or temperatures somewhat above or below normal, is non-tacky and does not flow. It is, however, flexible and yielding or resilient, and is plastic, so that it does not fracture or crack. These qualities are important in preserving the necessary continuous liquid-resistant barrier in a cap, and insure that the bond as well as the protective adhesive will not break down where the cushion liner deforms.

In these particular respects, namely the permanently plastic, and non-oxidizable and non-drying characteristics and firmness, as just explained, of the union between the liner and facing spot, the cap of the present invention improves upon the conventional article, and in addition, has all of the various advantages recited in my aforesaid patent.

The adhesive of the present invention is fusible at a relatively low temperature, water insoluble and acid-resisting, gas-resistant, forms a thin continuous, elastic and resilient coating or layer between the facing disc and the cushion liner.

The cap of the present invention is, therefore, an improvement over conventional caps, in that by reason of the permanent plasticity of the adhesive and its freedom from oxidization and drying and its firmness under temperature conditions usually encountered, the facing is held to the liner securely throughout its area and no opportunity is presented for objectionable slipping or separation of the facing or disintegration of the continuous barrier layer. Hence, the seal is maintained and opportunity for contact of the contents with the cushion material of the liner is reduced to a minimum.

Such conditions as shrinkage of the liner due to curing or storage, or bulging of the liner upon capping a container or upon becoming wetted do not impair the union between the facing and the liner, since the constant plastic nature of the adhesive and its incident flexibility and resilience compensate for these physical deformations without affecting the bond or the continuous protective barrier constituted by the adhesive stratum.

The cap of the present invention, furthermore, and of equal importance with the other advantageous characteristics, is capable of production at a considerable saving over the cost of producing conventional caps. This is due (1) to the use of less expensive adhesive; (2) to a shorter period of operation of affixing the spot to the cap and in producing the sheet or strip spot material, and (3) the spot material or the caps do not have to be stored or maintained or acted upon in a predetermined temperature controlled atmosphere or refrigerated, since the adhesive although heat sensitive and thermo-plastic, is, nevertheless, firm at normal or room temperatures and does not melt and flow or tend to dry when the temperatures are somewhat elevated above normal. The same advantageous condition is maintained at reduced temperatures. The advantages of these factors with resultant saving in the cost of production are appreciable when it is understood that substantially 80 million gross of caps are produced yearly.

It is a further objection of present day spot crowns that when subjected to an indentation pressure near the edge, the spot lifts, i. e. the edge separates from the liner. Thus any pressure upon the spot near the edge thereof will act to loosen the same, producing an unreliable closure. Indentation pressures, of course, occur at the capping machine as well as in the hoppers of the crowning machine where the caps are subjected to agitation. Frequently also these indenting pressures are exerted during the handling of thhe caps. When the edge of the spot is turned up even to a slight extent, any sliding action of the flared skirt of another crown contacting with the spot will dislodge it, sometimes completely. As a result the spots are loosened or entirely separated and when the crown is applied to a container, the spot may drop into the container or often the spot having become separated the cap is applied without the spot. Either of these conditions will produce deterioration of the product being bottled and is especially true in connection with pressure beverages as well as beer. The cap having a spot united to the liner thereof by a permanently plastic varnish-like coating in accordance with the present invention, is resistant to these objectionable indenting pressures notwithstanding that the spot be repeatedly subjected to the same.

As is well understood, in the punching out of spots from ribbon or sheet material, there occurs considerable waste, possibly 40%. With the present material, and particularly in the case of metal foils such as tin or aluminum, this waste can be compacted or compressed and directly melted for producing secondary pig metal or may be melted down with other metals in the foundry for the manufacture of alloys such as Alloy 12. Stated again, the use of a foil having a plastic varnish coating increases by several hundred per cent the value of the recovery from the waste over present materials.

In connection with the avoidance of temperature controlled conditions or refrigeration, I have found that a container having a cap of the present invention applied thereto is capable of sterilization without injury to the spot facing or its adhesive bond to the liner. This is advantageous in that the cap can be used upon bottled goods which must be sterilized and the sterilization can take place with the cap on the container, thereby saving a considerable expense in operation.

Referring to the drawing:

Figure 1 represents a bottom plan view of the usual crown cap having the cushion liner and center spot applied thereto.

Figure 2 is a sectional view of the cap of Figure 1 and showing the use of a center spot of paper provided with a resistant surface coating.

Figure 3 is a sectional view of the cap of Figure 1 showing a metal foil facing.

Figure 4 is a view representative of a strip or sheet of the spot material comprising a layer of paper having a coating of varnish on its exposed surface and a layer of adhesive on its undersurface from which the spot of Figure 2 is formed by punching.

Figure 5 is a view representative of a sheet or strip of spot material comprising a layer of metal foil having a coating of adhesive on its undersurface from which the spot of Figure 3 is formed by punching.

Figure 6 is a view of a spot after the same has been punched from the strip or sheet material of Figure 4.

Figure 7 is a sectional view of the spot of Figure 6.

Figure 8 is a view of the spot punched from the foil material of Figure 5, and

Figure 9 is a sectional view of Figure 8.

Referring to the drawing, I have illustrated in Figure 1 an ordinary crown shell 10 having a top 11 and a crimped skirt 12.

Affixed to the shell in the usual manner as by a heat and/or pressure sensitive adhesive or lacquer 10' is a cushion disc or liner 13 of natural cork, cork composition, pasteboard, rubber or rubber composition, or any of the known materials.

A center spot 14 of less diameter than that of the cushion liner 13 is attached to the liner by means of a stratum of adhesive 15. This facing spot is of an area to engage the sealing lip of a container and prevent the contents of the container from contacting with the material of the liner 13.

While the invention is particularly concerned with center spot facings, as shown in Figure 1, it is also applicable to overall facings, that is facings which are coextensive with the area of the liner or disc.

The center spot 14 will comprise the usual spot material such as paper 16, as shown in Figure 2, or metal foil 17, as shown in Figure 3. In the case of paper, the spots 14 are made of express, Kraft rope or other tough qualities having a hard or high gloss finish and are preferably coated with an acid, alkali and oil and water-resistant varnish 18. In the case of the metal foil spot 17, this usually is aluminum or tin foil and its exposed surface is ordinarily not treated.

The undersurface of the spot is provided with a continuous stratum of the adhesive 15 by which the spot is united to the liner 13.

In Figure 4, I have shown a laminated strip or sheet of paper facing material comprising a continuous coextensive underlayer 15 of adhesive, an intermediate layer 16 of paper and a continuous coextensive surface layer 18 of varnish. In Figure 5, I have shown a strip or sheet of metal foil facing material, wherein the continuous and coextensive layer of adhesive is indicated at 15 and the foil at 17. It will be understood that the unitary laminated structure comprising a coextensive and continuous layer of adhesive facing material of paper and resilient varnish or foil, is fed to a suitable punching machine, as described in my aforesaid patent, from which the spots or overall facings are produced and applied to the cushion liner of the cap by heat and pressure.

Referring to Figure 6, I have shown a spot punched from the material of Figure 4 and in Figure 7, I have shown a section of the same showing the unitary character of the article. In Figure 8, I have illustrated a spot punched from the material of Figure 5 and in Figure 9 a section through the same.

The usual practice in the manufacture of caps of the type disclosed has been to employ gutta percha in tissue or composition form which is a heat-sensitive adhesive and which is rendered tacky by the action of heat at the spotting machine and while in this condition the spot is punched out and pressed into contact with the exposed surface of the liner 13 and united thereto by heat and pressure. The usual procedure is in accordance with the method described in my Patent No. 1,788,260, granted January 6, 1931. Gutta percha, however, presents the several objections above mentioned which impair the utility of the cap.

Gutta percha is probably the most widely recognized and used of the various adhesives and cements and is quite satisfactory. The gutta percha is in the form, however, of an oxidizable composition and frequently in storage, as well as when used upon a container, oxidation and drying take place and the adhesive bond becomes brittle or granulates, so that the adherence of the spot to the liner is seriously reduced. So much so, in fact, that where the caps are allowed to remain in storage or are being cured and the liner 13 expands or contracts, the relatively fragile bond is broken and disrupted and the spot is loosened, so that the cap cannot be used. This same condition occurs where the cap is used upon pressure beverages, since the bond becomes stiff or fragile and any inequalities which are produced in the liner as by capping or internal pressures or moisture act to affect the bond, so that the spot becomes loosened and the continuous stratum is disrupted whereupon the contents seep past the spot into contact with the cushion material. In some cases, this actually causes contamination of the product and where seepage exists, should a break in the bond have occurred, the bond is completely lost, since the soaking of the liner will produce a warping which the adhesive uniting the facing to the liner is incapable of compensating for.

I have found that with a cap of the center spot type wherein the center spot is united to the cushion layer, in the manner now to be described, that a permanent and continuous liquid-resistant bond is assured between the spot facing and the cushion layer and one which will not deteriorate in storage or become defective under the normal conditions of usage, i. e. is unaffected by deformation of the liner disc.

I employ as the adhesive 15 a composition having all of the advantages of gutta percha as set forth in my aforementioned patent, i. e. it is heat fusible at a relatively low temperature, water insoluble and acid-resistant, gas-resistant, elastic and resilient and forms a thin continuous coating or stratum. But additionally and, moreover, the present composition (1) is permanently plastic, (2) is non-drying and non-oxidizable and hence does not assume a brittle state, and (3) is firm, i. e. non-tacky and does not flow at normal room temperatures or somewhat elevated temperatures or harder at reduced temperatures remaining within the limits usually encountered plastic, resilient and flexible. Gutta percha tends to soften and flow at but slightly raised temperatures and must often be refrigerated. On the other hand, the cap of this invention may be applied to a container and subjected to sterilization temperatures without injury.

The composition which I employ, i. e. a plastic varnish coating, is prepared as a flowable mass such as a paint or lacquer and is spread or sprayed upon the sheet or strip paper or foil surface, as desired. This composition comprises a resin, preferably a synthetic resin of the polyhedric alcohol-polybasic acid ("Glyptal") type, or a "Rezyl" resin, or a "Vinylite" resin (vinyl acetate), a cellulose derivative, such as nitro-cellulose, a plasticizer, such as the aliphatic tartrates and phosphates, and a solvent preferably an organic solvent having proper drying properties. These vinylite resins are usually polymers of vinyl acetate or vinyl chloride, or mixtures of vinyl acetate and the chloride. Vinyl acetate particularly can be combined well with soluble cottons (nitro-cellulose).

The resin is not limited to the glyptal or rezyl type, but should be one capable of dissolving the cellulose derivative and have a high coefficient of plasticity.

The resin or the composition may be modified by adding thereto in small percentage, non-drying vegetable oils such as castor oil to increase the plasticity. Semi-drying or drying oils are not desirable as they undergo oxidation.

Any suitable cellulose derivative may be used and in addition to nitro-cellulose, I use cellulose acetate.

The resin serves to modify and enhance the adhesive properties of the nitro-cellulose, and hence is a desirable modifying agent.

I have mentioned the particular plasticizers, but it will be understood that others equally capable of acting as a solvent for the nitro-cellulose are employed. In this connection, I prefer butyl tartrate. Also tricresylphosphate and phthalates such as dibutyl and amyl phthalates are employed. I also use methyl abietate with either ethyl or butyl alcohol. This latter is particularly useful for dissolving dammer and natural resins, as well as vinylite resins, where rubber is desired as a constituent of the plastic varnish. I find that a plastic coating of rubber containing varnish is also useful as the adhesive.

The organic solvent preferably consists of toluol, ethyl acetate, which promotes quick drying, and denatured alcohol, but, of course, other solvents capable of dissolving the mixture may be employed. Butyl acetate and butyl alcohol may also be used in the solvent mixture, as well as benzol although it is not preferred. I do not wish to be limited with respect to the solvent employed, provided, it imparts to the adhesive material proper drying properties.

A preferred composition of the above ingredients is given below:

| | Per cent |
|---|---|
| Synthetic resin | 10 |
| Nitro-cellulose | 14 |
| Plasticizer | 6 |
| Toluol | 27 |
| Ethyl acetate | 33 |
| Denatured alcohol | 10 |

The solution is applied to the paper or foil by spreading or spraying and will dry at normal temperatures in about twenty minutes.

It is to be noted that the composition is devoid of oxidizing oils which would tend to make the finish or coating brittle. However, it is possible to combine with the synthetic resin the semi-oxidizing or non-oxidizing oils to make a suitable composition, and, therefore, I do not intend to exclude the use of oils of this character either in combination with the other ingredients or as a substitute for one or more of the ingredients mentioned above.

Instead of allowing the adhesive coating to assume a firm and plastic condition without positive heating and drying, I apply the solution to the paper or foil at a temperature of about 200° F. and dry the coating at substantially the same temperature. This drying is accomplished in from one to two minutes at 200° F. and effects a considerable saving in time period of operation. It is advisable to keep drying temperature below 350° even though time of drying is short. The drying cycles will naturally vary with the degree of air change, and the tendency is to shorten time of drying. There is formed a permanently plastic coextensive coating or layer, as shown in Figures 4 and 5, whereby spots of the structure shown in Figures 6 and 8 may be readily punched therefrom. The adhesive is applied to the cushion liner by the usual spotting machine and is heat-sensitive, whereby it is rendered fusible by the heating instrumentality of the spotting machine and immediately pressed into bonded relation with the exposed surface of the cushion liner. Thereupon, the adhesive assumes a firm and permanently plastic condition, whence it is compensatory for any physical changes which occur in the cushion liner and is neither broken nor strained, nor is its continuous, impermeable character disrupted by the expansion or contraction of the liner, so that the spot and liner are permanently connected throughout the area of their respective contact surfaces by a continuous protective barrier.

In view of this permanently plastic and firm connection between the facing and the liner disc, the caps may be manufactured and stored without fear of the spots loosening and may be applied to containers, particularly those of the pressure beverage type with assurance that the spot will not separate from the liner to either weaken the seal or permit the contents to contact with the liner material.

I have discovered that by employing an adhesive of the character set forth, it is unnecessary to pre-size or treat the surface of the metal foil before applying the adhesive. Moreover, the adhesive stratum does not tend to swell when subjected to moisture and does not lose its adhesive properties throughout pasteurizing temperatures which may run as high as 185° F. Further, I have discovered that a stratum of this character has an adhesive affinity for metal foil, particularly, and also for other facings to substantially the same extent as for cork. This affinity becomes evident after extended use of a cap of this character. It is observed that there is virtually no tendency for the metal foil center to fall from or to readily separate from the cushion layer. Upon forced separation of the facing and cushion layer, a very large portion of the adhesive stratum adheres to the center spot facing and substantially to the same extent as to the cork.

Moreover, I have discovered a very unusual property, namely, that the mechanical pressure to which the facing and adhesive are subjected while the cap is positioned on the bottle improves or enhances the adherence of the center spot facing to the cork disc. In other words, actual tests have shown that, although center spot caps containing a gutta percha stratum deteriorate from the date of manufacture, particularly after being applied to a bottle, so far as adhesion of the center spot to the cushion disc are concerned, the caps of my application actually improve and when examined after a period of use the spots are more firmly united to the cushion disc than when the caps are first manufactured. This continued improvement in the adhesion has been observed throughout periods of over a year and is a vital characteristic of this invention.

I claim:

1. In a cap which incudes a metal shell, a cushion liner, a center facing of less diameter than the cushion liner positioned on the latter, and a stratum of heat-fusible adhesive interposed between the facing and liner and uniting the two, said stratum comprising a cellulose derivative adhesive.

2. In a cap which includes a metal shell, a cushion liner, a center facing of less diameter than the cushion liner positioned on the latter, and a stratum of heat-fusible adhesive interposed between the facing and liner and uniting the two, said stratum comprising a cellulose derivative adhesive and a modifying agent enhancing the adhesive characteristics of said derivative.

3. In a cap which includes a metal shell, a cushion liner, a center facing of less diameter than the cushion liner positioned on the latter, and a stratum of heat-fusible adhesive interposed between the facing and liner and uniting the two, said stratum comprising a nitro-cellulose adhesive base.

4. In a cap which includes a metal shell, a cushion liner, a center facing of less diameter than the cushion liner positioned on the latter, and a stratum of heat-fusible adhesive interposed between the facing and liner and uniting the two, said stratum comprising a nitro-cellulose adhesive base and a modifying agent enhancing the adhesive properties of the nitro-cellulose.

5. In a cap which includes a metal shell, a cushion liner of cork, a center facing of metal foil of less diameter than the cushion liner positioned on the latter, and a stratum of heat-fusible adhesive interposed between the facing and liner and uniting the two, said stratum comprising a cellulose derivative adhesive.

6. In a cap which includes a metal shell, a cushion liner of cork, a center facing of metal foil of less diameter than the cushion liner positioned on the latter, and a stratum of heat-fusible adhesive interposed between the facing and liner and uniting the two, said stratum comprising a cellulose derivative adhesive and a modifying agent enhancing the adhesive characteristics of said derivative.

7. In a cap which includes a metal shell, a cushion liner of cork, a center facing of metal foil of less diameter than the cushion liner positioned on the latter, and a stratum of heat-fusible adhesive interposed between the facing and liner and uniting the two, said stratum comprising a nitro-cellulose adhesive base.

8. In a cap which includes a metal shell, a cushion liner of cork, a center facing of metal foil of less diameter than the cushion liner positioned on the latter, and a stratum of heat-fusible adhesive interposed between the facing and liner and uniting the two, said stratum comprising a nitro-cellulose adhesive base and a modifying agent enhancing the adhesive properties of the nitro-cellulose.

9. In a cap which includes a metal shell, a cushion liner, a center facing of less diameter than the cushion liner positioned on the latter, and a stratum of heat-fusible adhesive interposed between the facing and cushion liner and uniting the two, said stratum comprising a cellulose derivative adhesive and a resin.

10. In a cap which includes a metal shell, a cushion liner of cork, a center facing of less diameter than the cushion liner positioned on the latter, and a stratum of heat-fusible adhesive interposed between the facing and cork cushion and uniting the two, said stratum comprising a cellulose derivative adhesive and a resin.

11. In a cap which includes a metal shell, a cushion liner, a center facing of metal foil, and a stratum of heat-fusible adhesive interposed between the facing and cushion liner and uniting the two, said stratum comprising a cellulose derivative adhesive and a resin.

12. In a cap which includes a metal shall, a cushion liner of cork, a center facing of metal foil, and a stratum of heat-fusible adhesive interposed between the facing and cork cushion and uniting the two, said stratum comprising a cellulose derivative adhesive and a resin.

13. In a cap which includes a metal shell, a cushion liner, a center facing of less diameter than the cushion liner positioned on the latter, and a stratum of heat-fusible adhesive interposed between the facing and cushion liner and uniting the two, said stratum comprising a nitro-cellulose adhesive and a resin.

14. In a cap which includes a metal shell, a cushion liner of cork, a center facing of less diameter than the cushion liner positioned on the latter, and a stratum of heat-fusible adhesive interposed between the facing and cork cushion and uniting the two, said stratum comprising a nitro-cellulose adhesive and a resin.

15. In a cap which includes a metal shell, a cushion liner, a center facing of metal foil, and a stratum of heat-fusible adhesive interposed between the facing and cushion liner and uniting the two, said stratum comprising a nitro-cellulose adhesive and a resin.

16. In a cap which includes a metal shell, a cushion liner of cork, a center facing of metal foil, and a stratum of heat-fusible adhesive interposed between the facing and cork cushion and uniting the two, said stratum comprising a nitro-cellulose adhesive and a resin.

ALBIN H. WARTH.